United States Patent [19]
Johnson et al.

[11] Patent Number: 5,958,819
[45] Date of Patent: *Sep. 28, 1999

[54] STABLE ZIRCONIUM PILLARED CLAYS

[75] Inventors: Jack Wayne Johnson, Clinton; John Francis Brody, Bound Brook, both of N.J.

[73] Assignee: Exxon Research and Engineering Company, Florham Park, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/986,056

[22] Filed: Dec. 5, 1997

Related U.S. Application Data

[63] Continuation of application No. 08/660,586, Jun. 11, 1996, abandoned.

[51] Int. Cl.$^6$ ........................................ B01J 21/16
[52] U.S. Cl. ........................ 502/84; 502/80; 502/74
[58] Field of Search .................... 502/74, 80, 84

[56] References Cited

U.S. PATENT DOCUMENTS

| | | | |
|---|---|---|---|
| 4,176,090 | 11/1979 | Vaughan et al. | 502/63 |
| 4,845,066 | 7/1989 | Fahey et al. | 502/84 |

*Primary Examiner*—Thomas Dunn
*Attorney, Agent, or Firm*—Jay Simon

[57] ABSTRACT

Stable, zirconia-pillared clays of reduced gallery height, useful as supports for hydroconversion catalysts, are prepared by treating clays with a zirconium compound, a surfactant and water, and compositing the reduced gallery height clay with suitable metal or metals.

15 Claims, 2 Drawing Sheets

STABLE ZIRCONIUM PILLARED CLAYS

This a continuation of application Ser. No. 08/660,586, filed Jun. 11, 1996, now abandoned.

FIELD OF INVENTION

This invention relates to the preparation of new pillared clays useful in preparing catalysts for the hydroconversion and hydroisomerization of waxy materials. More particularly, this invention relates to pillared clays of reduced gallery height that exhibit greater activity when combined with a suitable metal in hydroconversion processes.

BACKGROUND OF THE INVENTION

Pillared clays, made from natural or synthetic clay, and their preparation are well known to the scientific literature. Because of the spacing between clay layers or sheets, i.e., the gallery height, provided by the pillaring material, these clays exhibit microporous properties making them useful in the preparation of various catalysts. Nevertheless, zirconia-pillared clays of reduced gallery height, i.e., less than about 8 Angstroms are unstable at temperatures above about 250° C., particularly so at temperatures above about 300° C., and the microporous qualities are destroyed or rendered inadequate for use as catalysts. Since a variety of processes, particularly hydroconversion processes, occur at temperatures above about 250–300° C., pillared clays having the requisite stability are sought. This invention provides a method of preparing stable, reduced gallery height zirconia-pillared clays, useful in the preparation of catalysts for the hydroconversion of waxy feeds.

SUMMARY OF THE INVENTION

In accordance with this invention, stable, zirconia-pillared clays (ZrPILCs) of reduced gallery height, between 4 and 7 Å, can be prepared and are stable at temperatures exceeding 300° C., thereby retaining their properties and resulting in catalysts when incorporating a suitable catalytic metal or metals. Additionally, these materials have greater activity than catalysts employing zirconia-pillared clays of normally occurring gallery height, e.g., greater than 7 to about 20 Å.

Pillared clays exhibit certain characteristics in addition to gallery height, such as surface area, pore volume, etc. However, the stability of a pillared clay is usually defined—and for purposes of this invention will be defined—as the ability of the pillared clay to maintain its gallery height after exposure to temperatures in excess of 300° C. Thus, for pillared clays of reduced gallery height known to the art, exposure to temperatures above about 300° C. causes the pillars to collapse and the pillared clay to become amorphous and gallery height can no longer be measured by X-ray diffraction. The pillared clays of this invention and the catalysts made therefrom, however, maintain or substantially maintain their initial gallery heights, i.e., at least about 80%, preferably at least about 90% of the gallery height is maintained after exposure to temperatures $\geq 300°$ C.

The new pillared clays of this invention are prepared by treating crystalline, swellable natural or synthetic clays, smectites or micas, with a pillaring agent comprising a zirconium containing compound such as zirconyl halide, oxyhalide, e.g., chloride or oxychloride, or a zirconyl nitrate or oxynitrate, a surfactant and water or a polar organic solvent.

PREFERRED EMBODIMENTS

Figure 1:
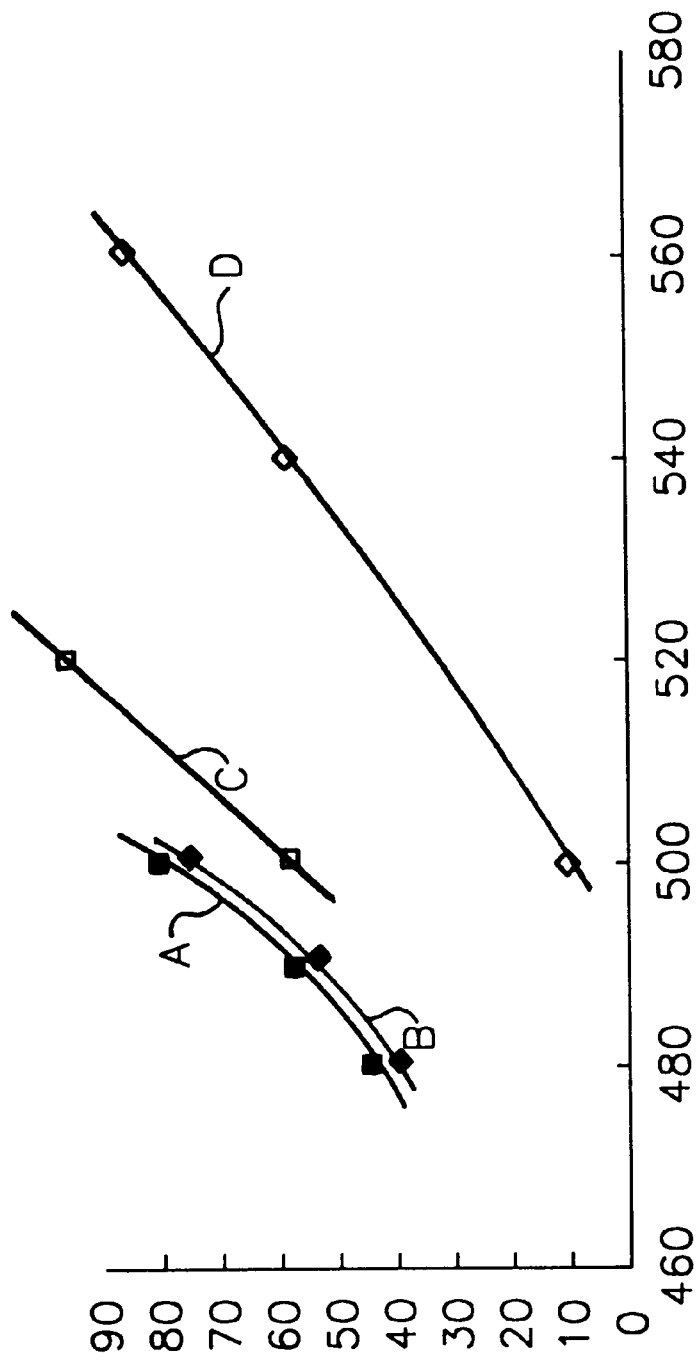
FIG. 1 graphically depicts activity of several different pillared clay catalysts; the ordinate being % hexadecane conversion, the abscissa being temperature in ° F.; and where curves A, B and C represent hydroconversion with catalysts of this invention and curve D represents hydroconversion using a comparative pillared clay having a gallery height of 10 Angstroms.
Figure 2:
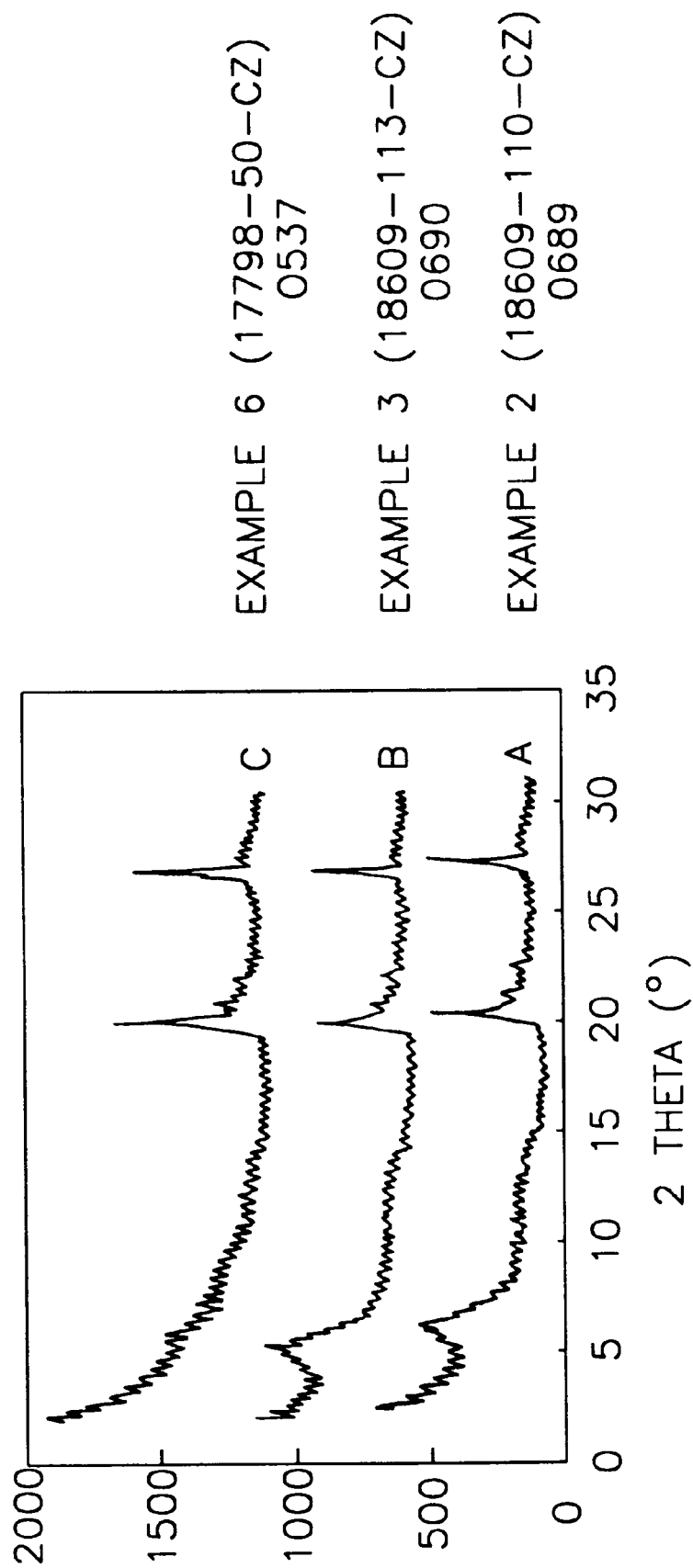
FIG. 2 shows X-ray powder diffraction patterns of various materials. Thus, patterns A&B correspond to Examples 2 and 3 below, in accordance with this invention while pattern C corresponds to Example 6, a material not in accordance with this invention. All patterns were determined using $CuK_{\alpha c}$ radiation after calcination of the clay and before palladium loading.

The pillared clay of reduced gallery height can be composited with a metal or metals of Group VIII, noble or non-noble, Group VI, e.g., chromium, molybdenum, tungsten, or Group 1B, e.g., copper, to produce a high activity hydroconversion catalyst.

Suitable clays include natural and synthetic smectites and micas, layered materials formed from layers comprising two sheets of silicon tetrahedra with a sheet of aluminum octahedra in between. When immersed in water or other polar solvents, these materials swell. When an inorganic polymer, such as zirconyl chloride or zirconyl acetate is introduced with the swelling, polar liquid, an expanded material is produced when subjected to appropriate temperatures for a suitable period of time. After calcining, a stable metal oxide, e.g. $ZrO_2$, remains as a pillar between the sheets. Gallery height is, therefore, defined as the augmented interlayer spacing of the clay sheets measured by powder X-ray diffraction less the thickness of the clay sheets (~9.6 Å).

Smectites and micas useful in this invention may be generally represented by the following formula:

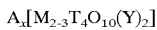

where A is the exchangeable interlayer cation, $0 \leq x \leq 1$; M is the octahedral cation; T is the tetrahedral cation, and Y is hydroxyl (OH) or fluorine (F) either singly or in combination. The T coordinated ion is commonly $Si^{+4}$, $Al^{+3}$ or $Fe^{+3}$, but may also be other four coordinate ions, e.g., $P^{+5}$, $B^{+3}$, $Ga^{+3}$, $Cr^{+3}$, $Ge^{+4}$, $Be^{+2}$. The M coordinated ion is typically $Al^{+3}$ or $Mg^{+2}$, but may also be other hexacoordinate ions, e.g., $Fe^{+3}$, $Fe^{+2}$, $Ni^{+2}$, $Co^{+2}$, $Li^{+}$, $Cr^{+3}$, $V^{+3}$.

Suitable clays include montaorillonite, bentonite, beidellite, nontronite, saponite, vermiculites, hectorite and fluorohectorite, as well as fluoromicas such as sodium tetrasilicic mica (NaTSM) and synthetic taeniolite, e.g., lithium taeniolite ($Li[Mg_2Li]Si_4O_{10}F_2$).

The pillaring agent, which expands the spacing between the clay sheets, is for this invention, a zirconium containing compound, preferably a zirconyl halide or oxyhalide, nitrate or oxynitrate in conjunction with a surfactant (e.g., a molecule having a polyethylene oxide hydrophilic portion and an alkane hydrophobic portion) and water. The pillaring agents form oligomeric anions that replace the exchangeable cations between the clay layers when the solution of pillaring agent is contacted with the swellable clay.

The surfactants useful in this invention are characterized as organic molecules with polar and non-polar portions, and examples of which are the product of a mixture of linear secondary alcohols reacted with ethylene oxide and having the general structural formula $C_{11-15}H_{23-31}O[CH_2CH_2O]_xH$ wherein x may range from about 4 to about 50. An example of such a material has an average molecular weight of 415 and is sold commercially as Tergitol 15-S-5. Also suitable are similar products with larger ethylene oxide portions, such as Tergitol 15-S-12 and Tergitol 15-S-40.

The amount of water required during the pillaring reaction is a function of the surfactant employed. We believe, but do not wish to be bound thereby, that sufficient water should be used to dissolve the surfactant. In the case of Tergitol 15-S-5, the surfactant solubility in water is approximately 0.1% by weight. More cost effective syntheses, using lower total volumes of water can be achieved using more soluble surfactants, such as Tergitol 15-S-12 and Tergitol 15-S-40.

The amount of pillaring reagent employed in the preparation of reduced gallery height zirconia-pillared clays should contain at least about 0.002 mole Zr per gram of clay, preferably at least about 0.003 mole Zr per gram of clay, and more preferably from 0.003 mole Zr per gram of clay to 0.100 mole Zr per gram of clay, still more preferably from 0.003 mole Zr per gram of clay to 0.030 mole Zr per gram of clay, and still more preferably about 0.003–0.010 mole Zr per gram of clay. Greater amounts of zirconium compound can be used but are essentially wasteful.

The amount of surfactant employed in the preparation of reduced gallery height zirconia-pillared clays should be from about 0.05 to 1.0 g surfactant per gram of clay, preferably from 0.08 to 0.5 g surfactant per gram of clay, more preferably from 0.2 to 0.4 g surfactant per gram of clay.

The pillared clay of reduced gallery height can be prepared by mixing the surfactant, the pillaring agent in solution, and the clay in appropriate amounts, followed by stirring, preferably vigorously so that the clay is fully exposed to the zirconyl compound and the surfactant, for about 1 to 24 hours. An essentially solid product is obtained from which chloride ions are removed, e.g., by washing and centrifuging, followed by drying for about 1 to 24 hours at 100–150° C. The washed and dried solid is then calcined, preferably in air or in an oxygen containing atmosphere, to anchor or secure the pillars to the clay sheets and to remove the organic components of the pillars. The pillars are essentially zirconia. Calcining temperatures are generally 300–500° C. in air or an oxygen containing gas, for about 16 to 48 hours, preferably at atmospheric pressure.

The dehydrogenation or metal functionality of the pillared clay catalyst is added by treating the pillared clay with a suitable metal or metals by a variety of techniques, e.g., impregnation, ion exchange, vapor deposition, etc. Impregnation is a suitable technique and is effected by mixing the pillared clay with a solution of a suitable metal salt, drying and calcining in air or in an oxygen containing gas to produce the metal oxide, followed by treatment with hydrogen or a hydrogen containing gas to reduce the metal oxide and activate the catalyst.

Metal functionality of the catalyst can be supplied by metals from Group VIII, noble or non-noble, Group VI, e.g. molybdenum, chromium or tungsten, or Group 1B, e.g. copper. Preferred metals are Group VIII metals, particularly the noble metals, most particularly platinum or palladium. Combinations of metals may also be used, for example, Pt/Pd, Ni/W, Co/Mo, Cu/Co/Mo. The amount of metal is present in sufficient quantities to provide hydroconversion activity and may range from about 0.1 wt % to about 20 wt % depending on the particular metal or metals employed, generally leading to metal loadings of about 0.1–5 wt %, preferably 0.1–2.0 wt %.

Characteristics of the pillared clay catalyst, in addition to the reduced gallery height include surface areas of at least about 100 $m^2/g$, preferably about 100–400 $m^2/gm$, more preferably about 200–400 $m^2/gm$; micropore volumes of at least about 0.03 ml/gm, preferably about 0.03–0.10 ml/gm, and more preferably 0.04–0.09 ml/gm.

Waxy feeds useful in this invention include slack waxes and waxes from the Fischer-Tropsch process (preferably from a non-shifting Fischer-Tropsch catalyst, such as cobalt or ruthenium), at least a portion of which boils above 700° F. While 700° F.+ feeds are preferred, some 700° F.– material may also be present but because of competitive adsorption on the catalyst (larger molecules preferentially adsorb) the 700° F.– materials are substantially unaffected by the hydroconversion process. Thus, hydroconversion is substantially limited to the 700° F.+ material and the feed is primarily 700° F.+, preferably at least about 80% 700° F.+.

The hydroconversion process, which converts 700° F.+ material to 700° F.– material is generally carried out at conversions of about 20–80% based on 700° F.+ feed. However, there exists a selectivity-conversion trade off. For example, as conversion increases, selectivity to desired distillate range products decreases. Thus, at high conversion proportionally more gas ($C_4$–) and naphtha ($C_5$–320° F.) are produced. Consequently, conversion preferably ranges from about 30–70%, more preferably 40–60% based on 700° F.+ feed.

Hydroconversion may be effected over a relatively broad range of conditions of hydrogen treat rates and elevated temperatures and pressures. For example, temperatures may range from about 450–750° F., preferably 500–700° F., and most preferably 550–600° F.; while pressure may range from 15 to 100 bar, preferably 30 to 70 bar. Hydrogen treat rates may range from 500 to 10,000 SCF/B, preferably 1000 to 5000 SCFIB feed. Space velocity may vary from 0.5 to 5 LHSV, preferably 0.5–2 LHSV.

After hydroconversion of the feed with the PILC catalyst, desirable distillate product can be recovered, e.g., by distillation. This product generally boils in the range 320–700° F. and satisfies or can be made to satisfy diesel fuel specifications.

The following examples will serve to illustrate but not limit this invention.

EXAMPLE 1

A 0.1 wt % solution of Tergitol 15-S-5 (containing 0.5 mmol surfactant/meq clay) was slowly added to 500 ml of 0.1 M zirconyl chloride solution. A 1.33 wt % clay suspension, made by stirring 10 gm of sodium bentonite (HPM-20, American Colloid Co.) in 750 ml of $H_2O$, was then added dropwise to the pillaring solution which was stirred vigorously at room temperature for 16 hours. The solid was washed and centrifuged repeatedly until free of chloride ions and then dried overnight at 120° C. The Zr-pillared bentonite was calcined in air at 350° C. for 48 hours to anchor the pillars to the clay sheet and to remove the organic component of the pillars. The catalyst was then loaded with 0.3 wt % Pd by incipient wetness impregnation using Pd $(NH_3)_4(NO_3)_2$ and recalcined at 350° C. for 3 hours. The sample exhibited a 15.7 A layer spacing (6.1 A gallery height) by powder XRD and a BET surface area of 218 $m^2/g$.

EXAMPLE 2

A 0.12 wt % solution of Tergitol 15-S-5 (containing 0.5 mmol surfactant/meq clay) was slowly added to 500 ml of 0.1 M zirconyl chloride solution. A 1.3 wt % clay suspension, made by stirring 10 gm of sodium bentonite in 750 ml of $H_2O$, was then added dropwise to the pillaring solution which was stirred vigorously at room temperature for 16 hours. The solid was washed and centrifuged repeatedly until free off chloride ions and then dried overnight at 120° C. The Zr-pillared bentonite was calcined in air at 350° C. for 16 hours. The catalyst was then loaded with 0.25 wt % Pd by incipient wetness impregnation using $Pd(NH_3)_4(NO_3)_2$ and recalcined at 350° C. for 3 hours. The sample exhibited a 14.4 A layer spacing (4.8 A gallery height) by powder XRD and a BET surface area of 227 $m^2/g$.

EXAMPLE 3

A 3.0 wt % solution of Tergitol 15-S-40 (containing 0.91 mmol surfactant/meq clay) was slowly added to 500 ml of 0.1 M zirconyl chloride solution. A 1.3 wt % clay suspension, made by stirring 10 gm of sodium bentonite in 750 ml of $H_2O$, was then added dropwise to the pillaring solution which was stirred vigorously at room temperature for 16 hours. The solid was washed and centrifuged repeatedly until free of chloride ions and then dried overnight at 120° C. The Zr-pillared bentonite was calcined in air at 350° C. for 16 hours. The catalyst was then loaded with 0.25 wt % Pd by incipient wetness impregnation using $Pd(NH_3)_4(NO_3)_2$ and recalcined at 350° C. for 3 hours. The sample exhibited a 16.6 A layer spacing 7.0 A gallery height by powder XRD and a BET surface area of 292 $m^2/g$.

EXAMPLE 4

A pillared clay catalyst was prepared from a commercially available sodium bentonite clay with zirconyl acetate solution as the pillaring agent using procedures similar to that described in United States Pat. No. 5,248,644 incorporated herein by reference. 500 ml zirconyl acetate solution (Magnesium Electron, ZAA, 22% $ZrO_2$) was diluted with 2.8 l distilled water and 50 gms sodium bentonite (American Colloid, Voclay HPM-20) was added. The dispersion was stirred vigorously at room temperature for 3 hours and the solid was isolated via centrifugation and washed with eight 4 l portions of water. The solid product was heated in an oven at 120° C. for 48 hours. The temperature was then increased at 100° C./hour to 200° C. held for 2 hours, increased at 100° C./hour to 400° C. and held for 2 hours. The layer spacing measured by XRD was 20.5 Angstroms (gallery height of 11 Angstroms). The pillared clay was then impregnated by incipient wetness with $Pd(NH_3)_4(NO_3)_2$ to a metal loading of 0.3 wt % Pd, washed, dried, and recalcined at 350° C. for 3 hours.

EXAMPLE 5

The catalysts of Examples 1–4 were tested for the hydroconversion, in this case hydroisomerization, of n-hexadecane in small scale batch reactors. The reactors were charged with 1 g $n-C_{16}$ and 0.1 g of catalyst, pressurized to 250 psi with hydrogen and heated for 2 hours at various temperatures in a fluidized sand bath. Products were analyzed by GC and GC-MS. The results are shown in FIG. 1. Clearly, the performance of the reduced layer spacing catalysts presented in curves A, B and C representing examples 1, 2 and 3, respectively, are significantly more active, achieving 50% conversion at temperatures below 500° F., while the normal layer spacing (10 Å) Zr-bentonite catalyst, curve D representing Example 4, requires a reaction temperature of 540° F. to effect this same level of conversion.

EXAMPLE 6

Sodium bentonite (2 g) was added to 100 ml of 0.1 M zirconyl chloride solution. The reaction mixture was stirred for 16 hr at room temperature. The resulting solid was washed repeatedly with water until free of chloride ions and dried overnight at 120° C. The product was then calcined in air at 300° C. for 24 hr. Examination of the product by X-ray diffraction showed no low angle peak which would correspond to a regular layer spacing. The BET surface of the product was 129 $m^2/g$. This example demonstrates that the absence of a surfactant in the preparation results in a clay without a specific gallery height and with a lower surface area.

What is claimed is:

1. A pillared clay comprising zirconium oxide pillars having a gallery height $\geq 4$ to $\leq 7$ Angstroms wherein the clay is selected from the consisting of swellable smectites and micas and said clay is capable of maintaing at least about 80% of said gallery height after heating to temperatures of $\geq 300°$ C.

2. The clay of claim 1 characterized in that one or more metals selected from the group consisting of Group VIII metals, Group VI metals, Group 1B metals or mixtures thereof are incorporated into the clay.

3. The clay of claim 2 characterized in that the metals incorporated into the clay are one or more Group VIII metals.

4. The clay of claim 3 wherein the metals are selected from the group consisting of platinum, palladium and mixtures thereof.

5. The clay of claim 2 characterized in that the clay has a surface area of at least about 100 $m^2/gm$.

6. The clay of claim 5 characterized in that the clay has a pore volume of at least about 0.03 ml/gm.

7. The clay of claim 6 wherein the swellable clay is a smectite.

8. The smectite clay of claim 7 wherein the smectite is selected from the group consisting of montmorillonite, bentonite, beiderite, nontronite, saponite, hectorite and fluorohectorite.

9. The clay of claim 6 wherein the swellable clay is a mica.

10. The mica clay of claim 9 wherein the mica is selected from the group consisting of fluoromicas and synthetic taeniolite.

11. The clay of claim 6 characterized in that the pore volume ranges from about 0.03–0.10 $m^2/gm$.

12. The clay of claim 5 characterized in that the surface area ranges from about 100–400 $m^2/gm$.

13. A process for preparing a stable pillared clay having a reduced gallery height of $\geq 4$ and $\leq 7$ Angstroms comprising reacting a swellable clay with a zirconium compound acting as a pillaring agent, water and surfactant for a period sufficient to form a zirconyl pillared clay, washing the resulting solid and calcining the washed solid wherein said clay is capable of maintaining at least about 80% of said gallery height after heating to temperatures of $\geq 300°$ C.

14. The process of claim 13 characterized in that the surfactant has the general formula $C_{11-15}H_{23-31}O[CH_2CH_2O]_xH$.

15. The process of claim 14 characterized in that the molecular weight of the surfactant ranges from about 250 to 2000.

* * * * *